United States Patent [19]

Pietschmann

[11] 4,286,948

[45] Sep. 1, 1981

[54] DENTAL TREATMENT APPARATUS

[75] Inventor: Helmut Pietschmann, Karlsbad, Fed. Rep. of Germany

[73] Assignee: Sybron Corporation, Rochester, N.Y.

[21] Appl. No.: 140,772

[22] PCT Filed: Oct. 16, 1978

[86] PCT No.: PCT/DE78/00027

§ 371 Date: Jun. 15, 1979

§ 102(e) Date: Jun. 11, 1979

[51] Int. Cl.[3] .............................................. A61C 1/14

[52] U.S. Cl. .................................................... 433/77

[58] Field of Search ............................ 433/77, 78, 28

[56] References Cited

U.S. PATENT DOCUMENTS

| | | | |
|---|---|---|---|
| 3,179,868 | 8/1965 | Guichet | 433/28 |
| 3,718,972 | 3/1973 | Fox et al. | 433/28 |
| 3,755,899 | 9/1973 | Betush | 433/28 |
| 3,972,120 | 8/1976 | Cope | 433/78 |

FOREIGN PATENT DOCUMENTS

| | | | |
|---|---|---|---|
| 2453519 | 5/1975 | Fed. Rep. of Germany | 433/78 |
| 2443708 | 3/1976 | Fed. Rep. of Germany | 433/28 |
| 2530478 | 5/1977 | Fed. Rep. of Germany | 433/77 |
| 2552957 | 6/1977 | Fed. Rep. of Germany | 433/78 |
| 2655201 | 2/1978 | Fed. Rep. of Germany | 433/78 |
| 2020541 | 7/1970 | France | 433/77 |

*Primary Examiner*—Gene Mancene
*Assistant Examiner*—John J. Wilson
*Attorney, Agent, or Firm*—Theodore B. Roessel; Roger Aceto

[57] ABSTRACT

In dental treatment apparatuses with a plurality of instruments which are connected to a supply component across spirally coiled supply lines attached to the apparatus at an upper level, and with a mounting for the instruments disposed at a lower level, it is required that the instruments be able to be removed from and inserted into the mounting comfortably and without mutual disturbance. It is proposed that the supply component is at an upper level, that each supply line has its individual point of attachment to the apparatus in its connection to the supply component and is spirally coiled in its entire length from the supply component at an upper level to the instrument mounted on a lower level, that the coil formed by each supply line from the connection to the supply component to the instrument runs freely suspended in an approximately straight line at a slight angle to the vertical, and that the instruments are suspended, pointing downward, in slots in the instrument mounting by means of molded parts on the end of the supply lines by the instruments or on the instruments themselves.

3 Claims, 2 Drawing Figures

FIG. 1
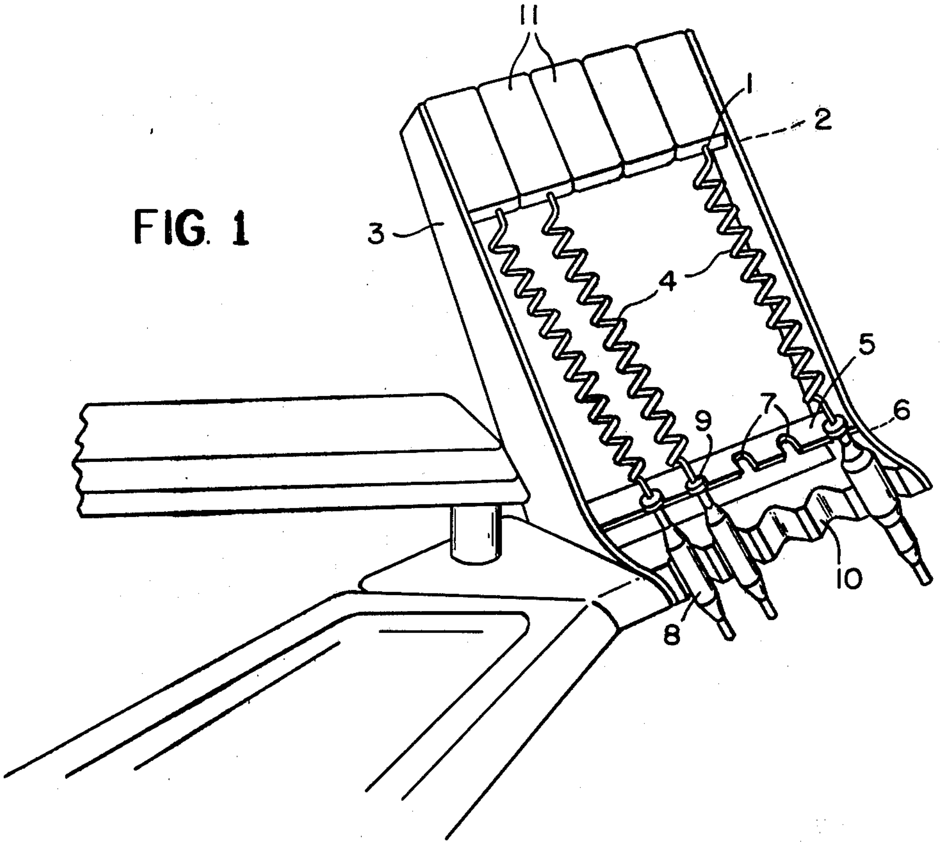
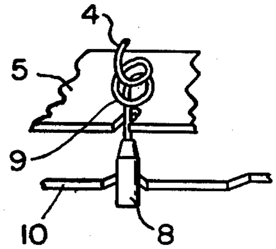
FIG. 2

DENTAL TREATMENT APPARATUS

The invention concerns a dental treatment apparatus according to the introductory description of the Claim 1.

For the return of the lines into the position corresponding to the rest position of the handpieces, and for the provision of a sufficient length for these lines in the utilization position, apparatuses have already been proposed which reduce the required expenditure for avoidance of supply lines sag and thereby interfere with the treatment.

In a known device (DT-OS No. 1628080), the supply line is supported for this purpose over a part of its length by a cylindrical coil spring which is attached at the point of emergence of the supply line from a supporting member so as to point upwards, and upon movement of the handpiece into its utilization position, a restoring effect is produced as a result of deflection in the direction of withdrawal. This device is certainly characterized by relatively low expense; it nevertheless has the disadvantage that in an unavoidable removal of a handpiece in a direction other than parallel to the planes fixed by the supply lines in the rest position of the handpieces, as occasioned in the practice, the adjacent handpieces and if occasion arises other adjacent devices may be endangered by an overswing of the spring during the replacement of a handpiece.

Another known device (DT-AS No. 2026839) eliminates this disadvantage by having the supply line carried over part of its length by a swivel arm on which a restoring force acts. This restorative force has a rectification component which, upon deflection of the line in the above-described manner, prevents an uncontrolled back-and-forth swing of the arm in or opposite to the actual direction of withdrawal. For this purpose however it also requires a greater expenditure in elastic and moving parts of the apparatus.

The task of the invention is to provide a dental treatment apparatus in which, with simultaneous avoidance of the disadvantages described, the expenditure in elastic and moving apparatus parts, as well as in arrangements for leading the supply lines between their connections and the instruments, is acceptable.

The problem posed is solved according to the invention by an apparatus which has the characteristics of Claim 1.

Through the cooperation of arrangement and choice of form of the supply lines according to the invention, the advantages of returning the supply lines without additional moving parts on the one hand and on the other hand an avoidance of risk to adjacent handpieces or other apparatus parts by uncontrolled swinging back and forth of a return device, advantages which are mutually exclusive in known apparatuses, are achieved simultaneously.

A further advantage is achieved in that the return of a supply line proceeds without risk to adjacent handpieces or apparatus parts, even when a handpiece is removed in any direction whatever within a wide range, without use of specially constructed mechanisms for directionally oriented return of the supply line.

Thereby, with the least possible expense, additional manipulations by the operator during a temporary change of his position to correct the position of an apparatus of prior art without directionally oriented return become unnecessary.

Thus the proposed apparatus combines in it the respective advantages possessed by one or the other known apparatus and prevents a certain effect of anxiety in the patient which may be caused by apparatus parts which are unexpectedly set in motion toward the patient.

Furthermore, the arrangement according to the invention makes possible the omission of all devices, whether stationary or moved under the influence of restoring forces, for guiding the supply lines between their connections to a supply component and the instruments.

The invention is particularly characterized by the fact that the operating case of known apparatuses is guaranteed by simpler, and therefore less expensive means.

With disposition of an apparatus according to the basic idea of the invention upon a swivel arm which is adjustable in height, the instrument support can be brought up directly alongside the patient's head. Extremely short handling movements thereby result for the dentist. The removal and return of an instrument into its rest position hereby requires no more attention than would be necessary with an instrument freely suspended in space.

Details of the invention and advantageous developments will be explained in the following with reference to the drawings.

DESCRIPTION OF THE DRAWINGS

FIG. 1 is perspective view showing a portion of a dental treatment apparatus employing my invention; and FIG. 2 is a view of a portion of FIG. 1 showing another embodiment.

DESCRIPTION OF THE PREFERRED EMBODIMENT

FIG. 1 shows a dental treatment apparatus (3) and the spatial orientation and coordination of supply unit (11), instrument mounting (5), supply lines (4) and their points of attachment (1) to the supply unit in a preferred form of construction proposed according to the invention.

For improved clarity, not all the supply lines are represented. The arrangement of five instruments represents no restriction of the disclosure. Fewer or more instruments may equally well be provided.

The supply lines (4) are each attached at (1) to the utility supply unit (11) on an upper level (2) of the treatment apparatus (3). From this point of attachment, the supply lines (4) run in an almost straight line at a slight angle to the vertical to the instrument mounting (5) on a lower level (6) of the treatment apparatus.

The instrument mounting (5) may, according to FIG. 1, have slots (7) for the reception of the instruments (8), or it may also be constructed in some other way, e.g. in the form of correspondingly curved round or flat material.

A further possibility is to provide for each instrument of separate, suitably shaped part and to arrange the individual mountings thus formed side by side. This would prove useful economically for the arrangement of more or fewer instruments. With these individual mountings, the preparatory switching functions for the provision of working media and/or power for the instrument withdrawn from the respective individual mounting can be triggered in per se known manners.

Suitably shaped molded parts (9) on the end of each line (4) adjacent the instrument or on the instrument itself allow suspension of the instrument with the instrument heads pointing downwards. The use of molded parts for mounting of the instruments permits economical production of the individual holders, since these do not have to be adapted to the different dimensions of various instruments.

To ensure the position of the instruments and to guarantee a trouble-free access to the instruments, a support (10) is provided which supports the instruments in a slightly oblique position.

Through a suitable arrangement of instrument mounting (5) and support (10), it can naturally also be achieved that the instruments do not, as represented, lie in one plane, but are fanned out with respect to each other. In addition to the suspended arrangement, this improves the accessibility of the instruments. The design possibilities indicated for the instrument mounting (5) apply analogously for the design of the support (10), including the possibility of providing individual supports in order to incorporate with each support the above-mentioned preparatory switching functions.

FIG. 2 represents, in section, an illustration for an alternative construction of the support (10) in the form of a suitably curved round material. Furthermore, in FIG. 2 another possibility for the construction of the molded part (9) is also represented. This consists in reinforcing a significant part of the last coil of a supply line so that the instrument is supported by this last coil.

The elastic effect of the spirally wound supply lines (4) accomplishes their return from a position of use into the rest position of the instruments, and indeed without additional elastic and moving apparatus parts.

As already mentioned, the apparatus can be placed close above the head of the patient. Immediately after the withdrawal of an instrument from its mounting, thereby, by virture of the arrangement of the supply lines according to the invention and because of the mentioned restoring effect due to their elastic construction in the form of spirally-shaped coils, the dentist's hand will be partially relieved from the weight of the instrument, since this is guided downwards toward the treatment area against the positive direction of the restoring force.

To achieve an acceptable position and regular arrangement of the supply lines, both ends of the spirally coiled supply lines are made concentric to the coil.

I claim:

1. In a dental treatment apparatus including a plurality of dental instruments of the type requiring a utility supply for each instrument, spirally coiled supply lines connecting each of the instruments to a utility supply, and an instrument mount, the improvement comprising:

(a) said utility supply being spaced above said mount and in a substantially straight vertical line from said mount;

(b) each of said utility supply lines being spirally coiled for substantially its full length from one end which is connected to said utility supply, to its other end which is connected to said instrument, each of said supply lines being freely suspended from said utility source to said instrument in a substantially straight vertical line; and (c) means adjacent the rear end of each instrument and cooperating with said mount for releasably holding said instruments substantially vertically suspended with the front of said instruments pointing downward.

2. Dental apparatus as set forth in claim 1 wherein the ends of each spirally coiled supply lines are arranged concentric to the spiral.

3. Dental apparatus as set forth in claim 1 wherein said means comprises said mount having a slot therein for receiving one of said dental instruments.

* * * * *